US005995941A

United States Patent [19]

Maquire et al.

[11] Patent Number: 5,995,941

[45] Date of Patent: Nov. 30, 1999

[54] DATA CORRELATION AND ANALYSIS TOOL

[76] Inventors: John Maquire, 152 Independence Rd., Concord, Mass. 01742; Terry Potter, 45 Jackson Dr., Acton, Mass. 01720

[21] Appl. No.: 08/929,600

[22] Filed: Sep. 15, 1997

Related U.S. Application Data

[60] Provisional application No. 60/026,128, Sep. 16, 1996.

[51] Int. Cl.[6] .................. H04B 17/00

[52] U.S. Cl. .................. 705/10; 455/2; 348/13; 235/52

[58] Field of Search .................. 705/10; 434/350; 455/2; 348/13; 235/52

[56] References Cited

U.S. PATENT DOCUMENTS

| | | | |
|---|---|---|---|
| 3,943,641 | 3/1976 | Dworetzky | 434/350 |
| 4,084,081 | 4/1978 | Raheb | 235/52 |
| 5,034,807 | 7/1991 | Von Kohorn | 348/13 |
| 5,226,177 | 7/1993 | Nickerson | 455/2 |
| 5,453,015 | 9/1995 | Vogel | 434/350 |

FOREIGN PATENT DOCUMENTS

| | | |
|---|---|---|
| 2286280 | 8/1995 | United Kingdom . |

*Primary Examiner*—Thomas R. Peeso
*Attorney, Agent, or Firm*—Bromberg & Sunstein LLP

[57] ABSTRACT

A system for capturing a video image of the scene and for correlating data relative to the scene is disclosed. The system comprises a collection device which uses as inputs environmental stimuli and video and audio stimuli which correlates the various data such that statistical analysis can be performed.

47 Claims, 6 Drawing Sheets

| | 92 | | | | 94 | | | | 96 | | | |
|---|---|---|---|---|---|---|---|---|---|---|---|---|
| 90 | $V_1$ | $V_2$ | ... | $V_n$ | $PV_1$ | $PV_2$ | ... | $PV_n$ | $NV_1$ | $NV_2$ | ... | $NV_n$ |
| t1 | floc | floc | ... | floc | b1...b100 | b1...b100 | ... | b1...b100 | b1...b100 | b1...b100 | ... | b1...b100 |
| t2 | floc | floc | ... | floc | b1...b100 | b1...b100 | ... | b1...b100 | b1...b100 | b1...b100 | ... | b1...b100 |
| t3 | floc | floc | ... | floc | b1...b100 | b1...b100 | ... | b1...b100 | b1...b100 | b1...b100 | ... | b1...b100 |
| t4 | floc | floc | ... | floc | b1...b100 | b1...b100 | ... | b1...b100 | b1...b100 | b1...b100 | ... | b1...b100 |
| • | floc | floc | ... | floc | b1...b100 | b1...b100 | ... | b1...b100 | b1...b100 | b1...b100 | ... | b1...b100 |
| • | floc | floc | ... | floc | b1...b100 | b1...b100 | ... | b1...b100 | b1...b100 | b1...b100 | ... | b1...b100 |
| • | floc | floc | ... | floc | b1...b100 | b1...b100 | ... | b1...b100 | b1...b100 | b1...b100 | ... | b1...b100 |
| tn | floc | floc | ... | floc | b1...b100 | b1...b100 | ... | b1...b100 | b1...b100 | b1...b100 | ... | b1...b100 |

FIG. 4

| | 102 | | | | 104 | | | | 106 | | | |
|---|---|---|---|---|---|---|---|---|---|---|---|---|
| 100 | $V_1$ $O_1 \ldots O_m$ | $V_2$ $O_1 \ldots O_m$ | . . . | $V_n$ $O_1 \ldots O_m$ | $PV_1$ | $PV_2$ | . . . | $PV_o$ | $NV_1$ | $NV_2$ | . . . | $NV_y$ |
| t1 | floc 1 | floc 1 | . . . | floc | b1. . .b100 | b1. . .b100 | . . . | b1. . .b100 | b1. . .b100 | b1. . .b100 | . . . | b1. . .b100 |
| t2 | floc 1 | floc 1 | . . . | floc 1 1 | b1. . .b100 | b1. . .b100 | . . . | b1. . .b100 | b1. . .b100 | b1. . .b100 | . . . | b1. . .b100 |
| t3 | floc 1 1 | floc 1 1 | . . . | floc 1 1 | b1. . .b100 | b1. . .b100 | . . . | b1. . .b100 | b1. . .b100 | b1. . .b100 | . . . | b1. . .b100 |
| t4 | floc | floc | . . . | floc 1 | b1. . .b100 | b1. . .b100 | . . . | b1. . .b100 | b1. . .b100 | b1. . .b100 | . . . | b1. . .b100 |
| • | floc 1 1 | floc 1 1 | . . . | floc 1 | b1. . .b100 | b1. . .b100 | . . . | b1. . .b100 | b1. . .b100 | b1. . .b100 | . . . | b1. . .b100 |
| • | floc | floc | . . . | floc | b1. . .b100 | b1. . .b100 | . . . | b1. . .b100 | b1. . .b100 | b1. . .b100 | . . . | b1. . .b100 |
| • | floc | floc | . . . | floc | b1. . .b100 | b1. . .b100 | . . . | b1. . .b100 | b1. . .b100 | b1. . .b100 | . . . | b1. . .b100 |
| tn | floc 1 | floc 1 | . . . | floc 1 | b1. . .b100 | b1. . .b100 | . . . | b1. . .b100 | b1. . .b100 | b1. . .b100 | . . . | b1. . .b100 |

FIG. 5

DATA CORRELATION AND ANALYSIS TOOL

This application claims benefit of Provisional Appln. 60/026,128 Sep. 16, 1996 now abandoned.

BACKGROUND OF THE INVENTION

The present invention related generally to apparatus and methods for correlating and analyzing data. More particularly, the invention relates to an apparatus and method for correlating data with respect to video images such that analysis on the data can be performed and video images associated with data segments can be readily retrieved. Many industries use optical systems in conjunction with various sensors to monitor environmental conditions. Examples of such industries are market research, security, and quality control. Various collection tools are employed in collecting the data and subsequently organizing the data. A common thread among these commercially available systems is that the data must be manually correlated with video data from the optical systems. For example, in the field of market research being performed on an oral presentation may include video images of the person making the oral presentation as well as feedback from the sample group. The feedback is generally obtained using electronic equipment which gauges the audience members reaction to the oral presentation. Once the presentation is complete the data from each of the audience members must then be correlated to that of the video segments. That is, when strong positive or negative reactions are attained, the relevant segment of the video must be located and data and the audience must be correlated therewith in order for the audience feedback to be meaningful. Often, this is a tedious, time consuming manual task that delays feedback to the oral presenter from two (2) to six (6) weeks.

The common practice is then to provide a written report detailing the analysis of the individual events that the audience found interesting in either a positive or negative manner. The report further identifies key responses that correlated to those events. Occasionally, along with the report a market research firm would provide the video tape of the oral presentation for further analysis by the presenter.

Accordingly, it is an object of the invention to provide a data correlation analysis tool that automatically correlates the video data to the audience feedback.

It is another object of the invention to provide statistical analysis of response data that the statistical analysis can be used for data processing.

It is still another object of the invention to create the correlated and analyzed video data substantially immediately.

It is still another object of the invention to provide a data analysis tool that is versatile and applicable across multiple industries.

These and other objects of the invention will be obvious and will appear hereinafter.

SUMMARY

The aforementioned and other objects are achieved by the invention which provides a data correlation and analysis tool and a method associated therewith. The invention comprises a system for capturing a video image of a scene and for correlating data relative to the scene.

In the data correlation and analysis tool, a collection means is used which receives the data from remote electronic sources and receives a video signal representative of the video image from a video camera.

The remote electronic sources that produce the data can be any of various types of sensors ranging from manually driven dial-type controls for human input to environmental controls, such as temperature gauges or flow controls in the case of process control, for example.

Electrically connected to the collection means is a correlation means which correlates the data to the video signal. In this way the environmental responses are associated with the video images from the video camera substantially instantaneously. Additionally, statistical analysis can now be performed on the data to find particular segments of the video which were associated with highs or lows or any of various other points that may be of interest to us inquiring or analyzing the information.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 4 shows a table representative of correlated data as found in memory within the data correlation and analysis tool of FIG. 3;

FIG. 5 shows a table representative of correlated data which would be found in a memory associated with the data correlation and analysis tool of FIG. 1.

DETAILED DESCRIPTION

While the present invention retains utility within a wide variety of data correlation and analysis systems, and data acquisition systems generally, and may be embodied in several different forms, it is advantageously employed in connection with market research systems. Though this is the form of the preferred embodiment and will be described as such, this embodiment should be considered illustrative and not restrictive.

Figure 1:
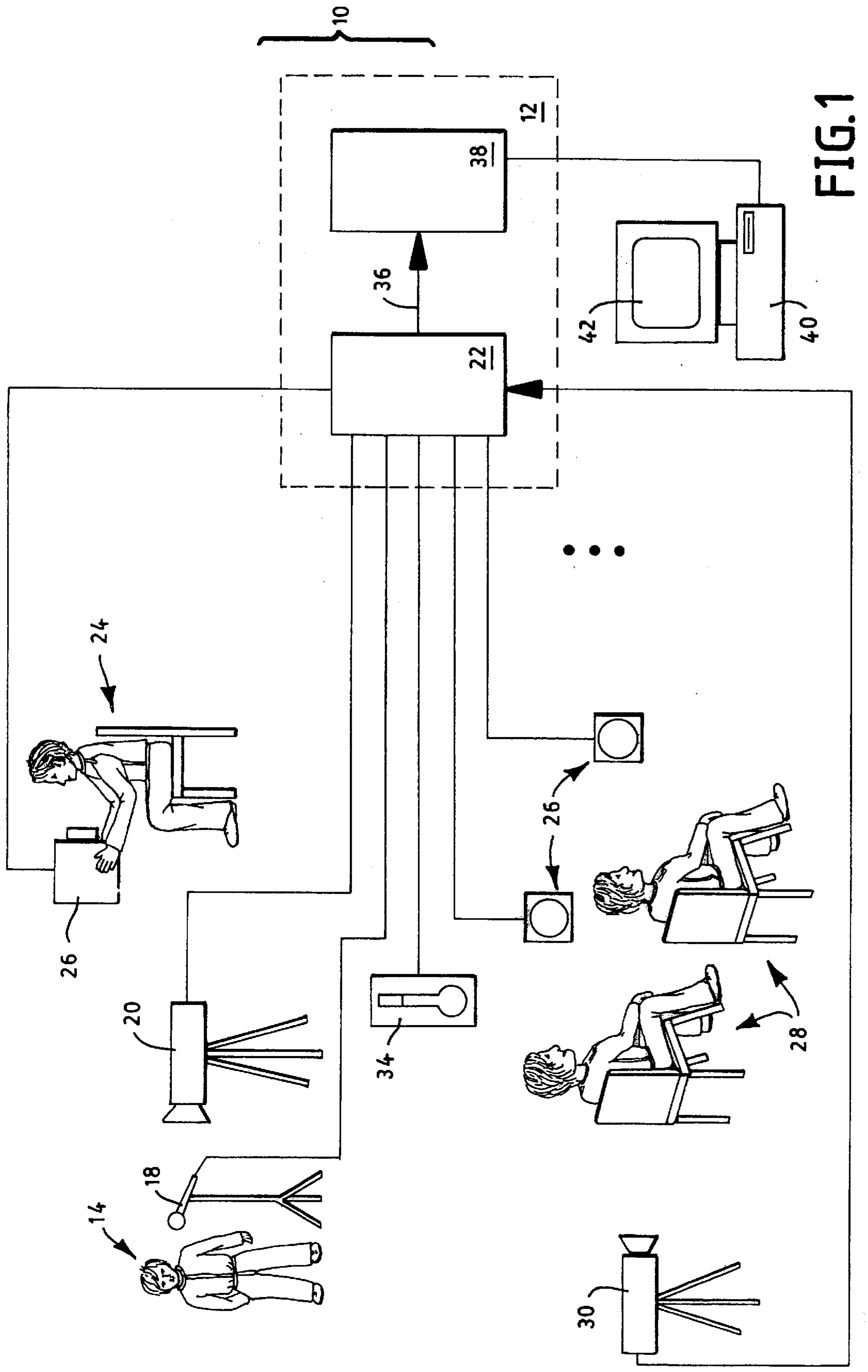
FIG. 1 shows a block diagram of a data correlation and analysis tool in accordance with the invention.

FIG. 1 shows a block diagram of a data correlation and analysis system 10 being used for market research. The data correlation and analysis system 10 uses processing module 12 which has various inputs from the environment. In this embodiment, a presenter 14 is making an oral presentation to a sample audience 24, 28. The presenter 14 could be interested in audience feedback for any of various reason: he/she has an upcoming important oral presentation and wants to know audience reaction; or has a new product or a series of products and is trying to ascertain public reaction to the product, for example. Additionally, the presenter 14 could be trying to gain judgement analysis on such topics as political, governmental, or legal presentations, for example.

In this embodiment, the presenter 14 speaks into a microphone 18 and has a video image captured by a video camera 20, both of which are fed into the processing module 12. One skilled in the art will realize that the presenter 14 need not be local for the invention to operate. The presenter 14 can be local or offsite, and the presentation can be in real time or time delayed. Within the processing module 12, the audio signal from the microphone 18 and the video signal from the video camera 20 are transmitted into a correlation unit 22.

Simultaneously therewith, an audience segment 24 inputs via response meters 26 their impression regarding the presentation being made by the presenter 14. One skilled in the art will realize that the audience can have varying population and demographics depending upon an amount of error is judged acceptable for the subsequent statistical analysis of their opinions.

In practice, as the presenter 14 speaks the members of the first audience segment 24 will judge positively or negatively in real time their impression of what is being said or done by the presenter 14. This impression is dialed into the response meters 26 by indicating on the response meter a numerical value representative of that impression. Each member of the audience has a response meter 26 to ensure that individual opinions are monitored. One skilled in the art will realize that the response meter 26 can be an analog or digital device which is commonly available in the art. In this embodiment, an analog meter is used which has a dial with a predetermined range, such as from one to ten, where one equates to a poor opinion of the presentation and ten means the presentation is excellent.

A member of the first audience segment 24 then uses the response meter 26 to dial in his/her impression of the presentation by selecting a value in that range. The response signal from the response meter 26 is fed back into the processing module 12 and into the correlation unit 22 where the response signal is correlated by time with the video signal and the audio signal.

In a simple data correlation and analysis system, the aforedescribed system could be complete with each member of the audience dialing in his/her impressions via the response meter 26 and being correlated. The hereinafter described analysis can then be performed without need for any additional information. In this embodiment though, a second audience segment 28 is shown also having response meters 26. This second audience segment 28 can be used for any of numerous reasons. The market research firm may wish to know, for example, how do the audiences impressions change with respect to their angle to the presenter, when they are in a separate room from the presenter 14, or in another city, inter alia. In this embodiment, the second audience segment 28 is located at an angle substantially different from that of the first audience segment 24.

A second video camera 30 is then located near the second audience segment 28. Although the second video camera 30 is optional, it does provide information on what is the actual image being perceived by the second audience segment 28. In this embodiment, the information obtained from these two groups can then be interpolated or extrapolated to many varying angles and distances from the presenter 14 with or without additional video feedback associated with each one.

Another form of data from the environment of the audience segments 24, 28 is environmental sensory information itself. An example of such environmental sensory information is that of temperature shown by a thermometer 34. Thermometers, moisture meters, et cetera, can be disposed around each audience segment such that data of environmental conditions is then correlated via the correlation unit 22 to the video image providing additional feedback for the presenter 14. Such a layout could show that as an audience gets warmer their opinions of the presentation go down, for example.

As previously stated, the various video, audio and data signals are input into the correlation unit 22. The correlated data 36 is then passed to an analysis unit 38 where the correlated data 36 is analyzed. Generally speaking, statistical analysis is used in the analysis unit 38 to find points of interest in the presentation by the presenter 14. For example, the analysis unit 38 can determine all low points where the audience was in general agreement of having a negative impression. The presenter 14 would be interested in such information such that it can be removed from the presentation or altered to avoid such negative reactions.

The form of the analysis can exceed simple averaging techniques. Numerous forms of statistical analysis can be done. For example, demographic information can be input into the analysis unit and can be stored in the correlation unit 22 or externally in a computer 40. The correlated data 36 can then be analyzed by demographic information such that the reactions of males versus females, for example, at any point in time can be analyzed. Further, analysis can be done by age or any various other demographic criteria that had been requested of the audience segments 24, 28.

In the case of using an external computer 40, analyzed correlated data can be passed to the computer or the raw information can be passed to the computer 40. If much of the processing is to be performed by the computer 40, then one of the purposes of the analysis unit 38 would be digital signal processing such that signals are smoothed and noise is reduced within the correlated data.

The computer 40 displays to user of the computer 40 through a graphical user interface ("GUI") 42 any statistical analysis that is requested as well as its associated video and audio segments. The GUI 42 can display the data in real time where the correlated data 36 is essentially passed through the analysis unit 38 to the computer 40 and is displayed. Or, the GUI 42 can operate on archival information where the information is stored on a bulk storage device, such as a computer hard disk, and analysis is performed on the archived information.

Figure 2A:
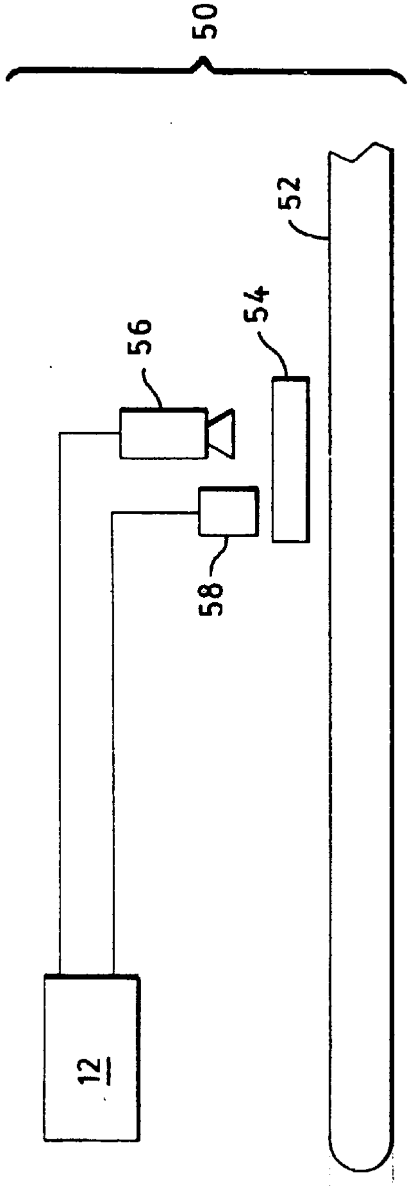
FIGS. 2A and 2B show block diagrams of additional applications of the data correlation and analysis tool shown in FIG. 1.
Figure 2B:
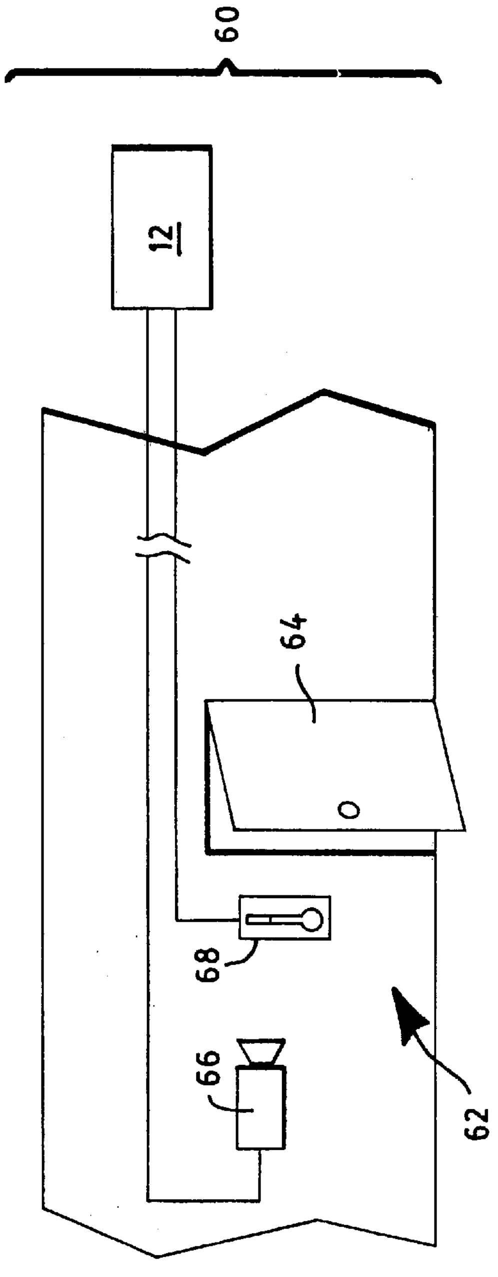

FIGS. 2A and 2B show additional embodiments of the invention. FIG. 2A shows a data correlation and analysis system 50 being used for quality control where a product 54 comes down a conveyor belt 52 to a quality control station having a camera 56 and a set of sensors 58. Depending on the type of product 54 that is being analyzed, the camera 56 can be a video camera which takes a video image of the product 54 in which case the video image is compared to a stored video image. Based upon statistical analysis, the data correlation and analysis system 50 then rejects or accepts the product 54. The camera 56 could also be a sonar or x-ray device for examining welds in manufactured devices. Further, in the case of welds, additional environmental information can include the temperature at which the weld was made for better quality control of the welds.

FIG. 2B shows another embodiment of the invention where the data correlation and analysis system 60 is being used for security purposes. In this embodiment, a video camera 66 is located in a room 62 having a door 64 which is being monitored. An environmental sensor, in this embodiment a temperature gauge 68, is also located in the room.

The video signal from the video camera 66 and temperature information from the thermometer 68 are passed back to the processing module 12 where each reading of the thermometer 68 and each frame or frames of the video are associated with time and analyzed. In this way, a statistical correlation can be found and statistical anomalies can be flagged to security personnel. For example, decreasing temperature can be correlated to the door 64 being opened alerting security personnel to the door 64 having been opened and marking for the security personnel the time of the decreased temperature and thus the entry. One skilled in the art will understand that numerous types such as door sensors and smoke sensors and quantities of sensors can be used to gain more information about the environment.

Figure 3:
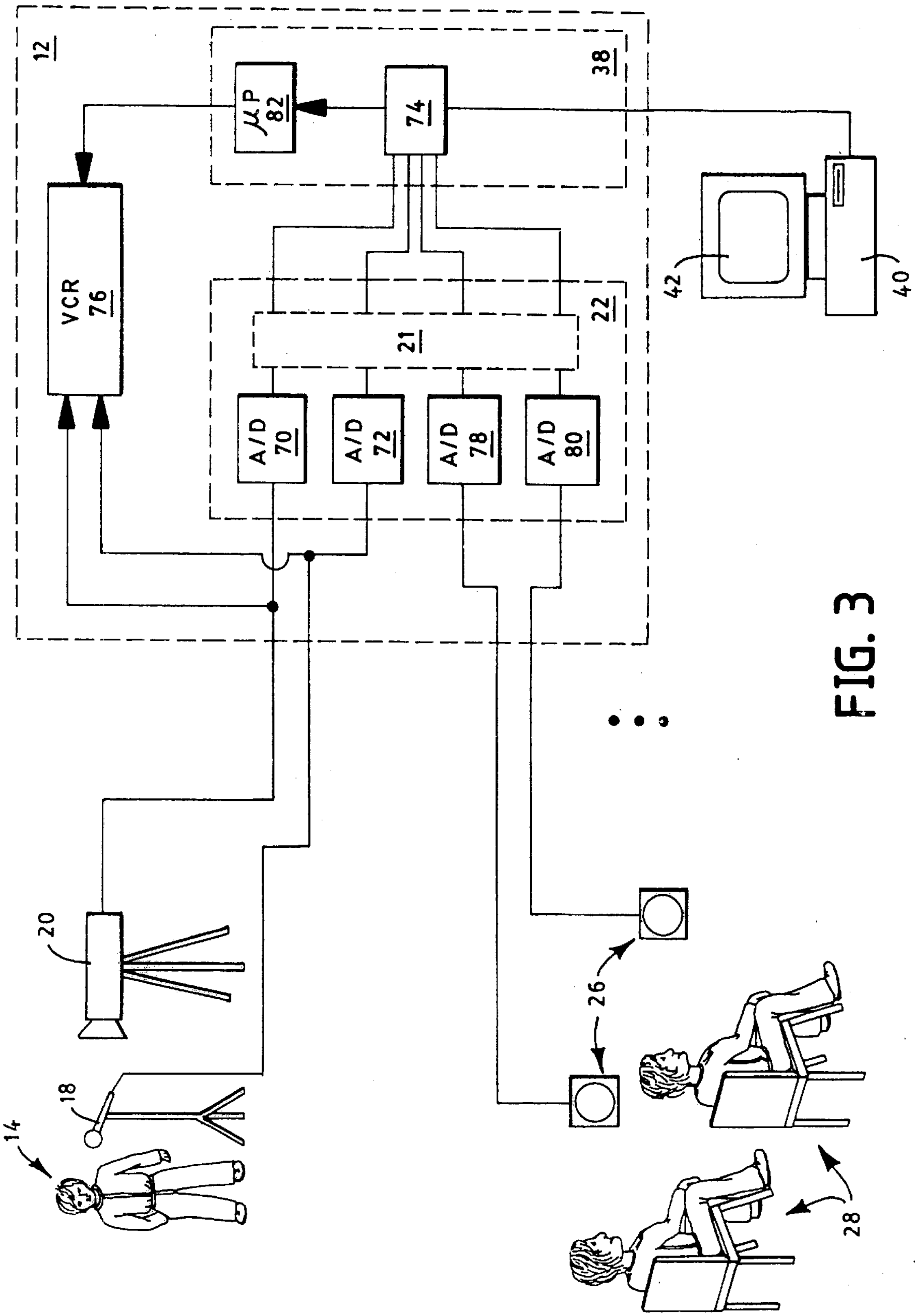
FIG. 3 shows the data collection correlation tool and analysis tool of FIG. 1 in greater detail.

FIG. 3 shows an additional embodiment of the invention where a VCR 76 is included in the processing module 12. In this embodiment, the video signal from the video camera 20 is passed into the processing module 12 and into the correlation unit 22, but is simultaneously passed into video storage device, such as a VCR 76, a writable CD or other device without regard to whether the device is analog or digital. Likewise, the audio signal from the microphone 18 is passed into the correlation unit 22 and is also passed into the VCR 76. Since both the video signal and the audio signal in this embodiment are analog signals, the VCR 76 can create a video tape of the presentation in a standard format, such as VHS for example. The presenter 14 can then have a full video tape of his/her presentation upon completion of the presentation.

Substantially simultaneously, the second audience segment 28 is using the response meter 26 to dial in their feedback to the presentation as previously described. In this embodiment, the response meters 26 are again analog devices wherein an analog signal representative of the response is passed into the correlation unit 22. One skilled in the art will realize that digital response meters can also be used. It should also be apparent that any of the response meters 26 can be wireless, and as such transport the response by RF to an antenna connected to the processing module 12. Examples of such digital response meters are computer devices where a computer display is shown to the audience member and responses are either input numerically via a keyboard, a touch-screen display is used, or any of various pointing devices.

Within the correlation unit 22, the video signal, audio signal and the numerous response signals pass through analog to digital converters 70, 72, 78, 80 where the signals are converted into digital form. Digital signals can then be passed into the analysis unit 38 where they are selectively stored on a memory device 74. A cache 21, as more fully described hereinafter, can also be present in the correlation unit 22 and assist with passing the digital signals from the memory device 74.

Depending on the implementation, the memory device 74 can be a magnetic disk or can be solid-state memory.

The analysis unit 38 subsequently performs statistical analysis on the output of the correlation unit 22 using a microprocessor 82. In this embodiment a summary video can be made where segments of the video information can be parsed based on interesting statistical correlations among the audience members thereby creating a summary video having only segments which are of interests to the presenter 14. For example, for basic highlights or lowlights, the analysis can simply look for somewhat uniform highs and lows in the responses and transmit video segments common to those responses.

If desired, demographics can be used to further refine the statistical analysis as previously described. The demographics can be input via the computer 40 such that ages, the sex and various other information relating to the audience members is known to the analysis unit 38 and video segments can be parsed based on demographic information. For example, the presenter 14 may be interested in knowing what the males thought of the presentation versus the females, or what different age groups felt about different segments of the presentation then the summary video would present the highlights and lowlights for the desired demographic group.

In this embodiment, the mass storage device 74 is a high-capacity magnetic storage device. If the video is being archived on the mass storage device 74, the video must be compressed. The reason for this is that video images use a substantial amount of storage capacity. Current video technology uses 30 frames per second where each frame has a normal resolution of 640 by 480 pixels. While this resolution can be altered, the aforementioned resolution is considered to be an acceptable video image.

The video is then generally in color and, therefore, has 24 bits of color associated with each pixel, eight bits per red, green, and blue ("RGB") color, creating approximately 1 megabyte of video information per frame at 30 frames per second. One skilled in the art will realize that the resolutions and the storage capacities used in the preferred embodiment are dependent upon the current state of the art. Higher resolutions may be used as the art advances in the area of image compression, or lower cost, higher capacity bulk storage devices become available.

For a one-hour video, this creates approximately 100 gigabytes of video information. This amount does not include audio or any of the response information necessary to do a proper analysis. Therefore, the video data must be compressed. In preferred embodiment, compression is performed within the correlation unit 22 such that the video is reduced to ten frames per second thereby cutting the storage requirements by one third, though one skilled in the art will realize that that increasing the number of frames per second is advantageous.

FIG. 4 shows a table of the contents of a typical memory used in the data correlation and analysis system. In a preferred embodiment a multi-channel associative cache is used. The multi-channel associative cache is an associative memory model which associates multiple video, audio and response variables 94 and newly created variables 96 with the dimension of time. In FIG. 4 there are multiple, up to 'n' video and audio stimulus streams that are gathered and stored within correlation unit 22.

The multi-channel associative cache logs the location of the stored and synchronized digitized multiple video and audio frames, as well as associations in the real time process, i.e., the response variables and their responses with these frames, other processed variables and new variables. These associations are then ordered as a function of time.

This associative memory then allows access to associative process variables 94, the new variables 96 as well as video and audio frames 92 by content as opposed to by physical address. Thus, analysis of the associated information is easily accessible.

This is referred to as a multi-channel associative cache because there are multiple, separate streams of input. In the associative cache the process variable might be a set of "male" respondents who are responding to one or more of the video-audio stimulus. In this example there could be up to 100 male respondents during the video frames associated with the first time slice, $t_1$. Any number of actual responders are possible.

FIG. 5 is another method by which the content of a typical memory can be displayed. Again, the multi-channel associative cache associates with time 100 multiple variables 102 (v1, v2, . . . vm,) such as multiple video, audio or text, with process variables 104 (p1,p2, . . . p0) such as responses, and environmental variables, and the newly created variables 106 (nv1, nv2, . . . nvy,) such as averages, for example. The newly created variables 106 can be one variable, such as an average, or a multitude of variables, such as a set of values of how far each process variable is from the mean, for example.

In this Figure, however, not only is a location designated in the table as a "floc" stored with each variable 102, the presence of separate objects (o1, o2 . . . on) within each of the variables 102 is noted by the presence of a 1. In this way, the presenter 14 can also see how objects affected the response. For example, at a political rally the system or presenter can designate as an object each nominee. The system would designate the nominees presence by a 1 for the nominee's object in the video variable and the nominee's voice by a 1 for the nominee's object number in the audio variable. Thus, the campaign can determine, for example, how the politician was received when they were on stage versus when they were talking on stage. If a nominee's spouse was designated as an object, the campaign can have analyzed the effect of the spouse's presence on the nominee's acceptance, for example.

The table can also convey the frequency of the variables 102 as is noted by the presence or absence of a "floc" in the table. Reading a column in the table allows the presenter to visually see the intermittent nature of the audio signal. In addition to communicating visually the frequency of events, the presence or the absence of a variable over time, can also assist the presenter to choose an appropriate time period it should instruct the analysis unit 38 to wait after the audio segment before analyzing the response. In the preferred embodiment, the analysis unit 38 will allow for a lag time between the one or more audio-video variables 102 and the process variables 104 upon which it will analyze, but this can be overridden by the presenter.

Further, although the table can store locations of the audio-video variables by a pointer, a representation of the video frame can also be stored in the table. The representation would normally be much smaller than the frame.

Figure 6A:
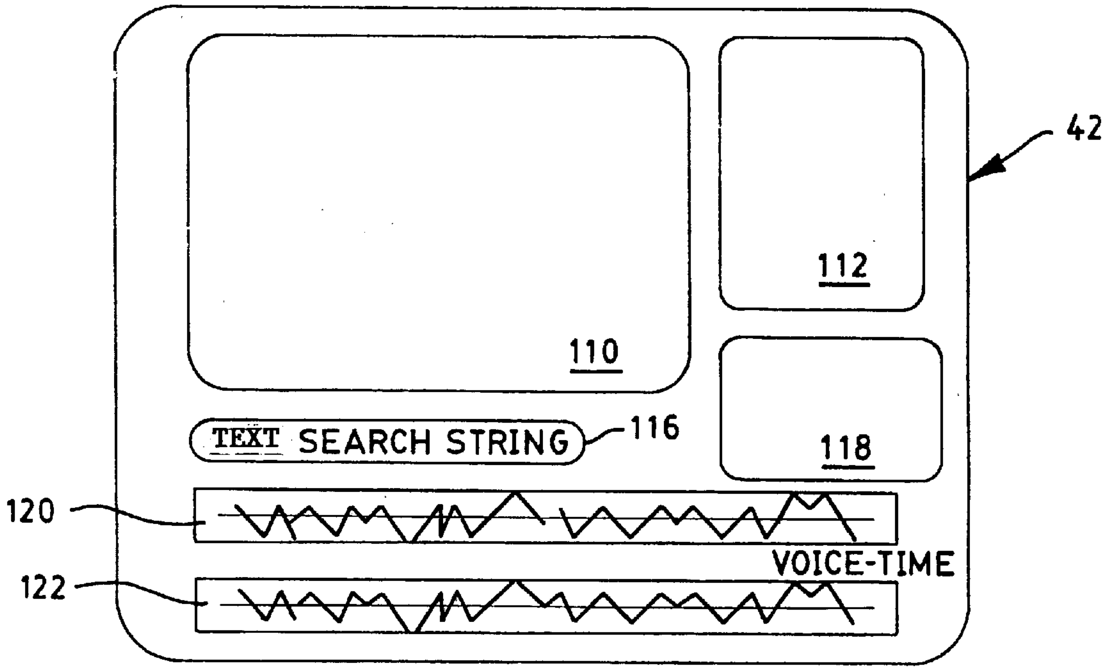
FIGS. 6A and 6B shows sample user interfaces for a computer display presenting the correlated and analyzed data generated by the invention.
Figure 6B:
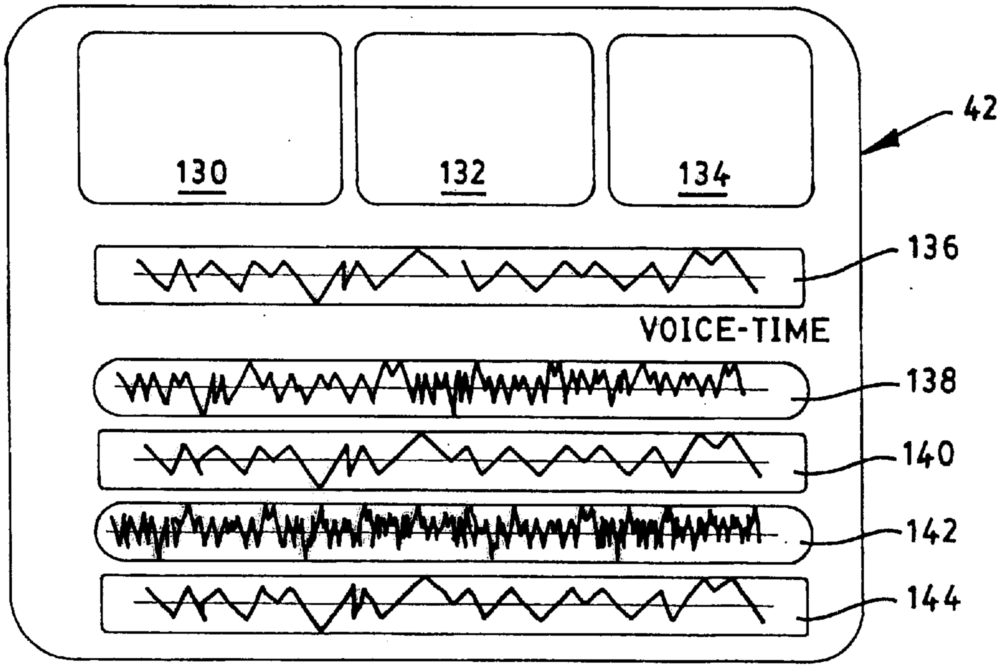

Turning now to FIGS. 6A and 6B which show control screens that allow the operator to control the automatic analysis and automatic creation of the summary audio-video which is shown above. In this screen, one or more processed variables are available to analyze along with an access to one or more audio-video variables. Analysis of a selected set of process variables are then available to be displayed along with its associated time series. Video segments are also available to be searched to determine associated process variables and their resulting analysis. The video-audio search can be done via a video search frame or clip 118 or supplement of a video frame clip. The video-audio segments associated with the variables or analysis of the variables can be displayed in a video subwindow 110. One can even select a set of criteria, highs or lows for examples, so that analysis then done can automatically find the associated video segments and play them back or create a new video.

A text search string 116 can also be used to locate segments of a video so that the associated responses or their analyses can be retrieved, further analyzed and used to create new stimulus for the research group. Text strings are usually a result of automatic analysis of the audio streams and are also stored in the associative map. Alternative display forms are easily created that allow for the display of multiple process variables 138, 140, 142, 144, multiple analyzed processed variables as well as scrolling text windows 132 as the video is played 130.

Pop down windows allow for the control of what statistical analysis is to be performed on the selected process variables as well as preferences and other control parameters. These pop down windows also allow one to tell the system how to deal with sample data and summary video outputs and inputs.

For example, the variable list 112 shows a list of the variables that might be used in a particular study. A user would select a process variable and the associative cache would return from the analysis unit 38 values for that variable. The analysis unit 38 would manipulate the data, such as smooth it and calculate highs and lows, inter alia, and present to the GUI 42 the audio data over time 120 and the response over time 122. Through the GUI 42, the presenter 14 can tell the analysis unit 38 to create other new variables or tell the associative cache to find other associated process variables.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of determining why an audience generates a response to a stimulus, the method comprising the steps of:
- recording the response from the audience to the stimulus;
- performing a statistical analysis of the response to determine notable reactions;
- replaying the notable reactions to the audience;
- querying the audience as to why the notable reaction was received; and
- recording a second response to why the notable reaction was received.

2. A method according to claim 1 wherein the steps are performed within a short time, the short time being before the audience leaves after viewing the stimulus.

3. A method of allowing a user to interactively search an audiences response to one or more stimuli comprising the steps of:
- providing a stimulus to the audience;
- recording one or more responses to the stimulus in real-time;
- correlating by time the one or more responses to the one or more stimuli to generate an associative mapping of the one or more responses and the stimuli;
- storing the associative mapping such that the associative mapping is accessible by content of the one or more responses and the one or more stimuli;
- prompting the user for search criteria representative of content of the one or more responses; and
- displaying to the user the one or more responses and the one or more stimuli meeting the search criteria.

4. A method according to claim 3 wherein the step of correlating the response to the one or more stimuli further comprises the step of generating an analyzed variable, the analyzed variable including the one or more responses and the one or more stimuli at a given time.

5. A method according to claim 3 wherein the analyzed variable is generated from the one or more responses to the one or more stimuli.

6. A method according to claim 3 wherein the stimulus is stored in the associative mapping as a plurality of data signals over time correlated to the one or more responses at a given time.

7. A method according to claim 3 wherein the search criteria include a time-duration of the one or more stimuli surrounding the response.

8. A system for storing a response to a stimulus and displaying the response to a user in real-time, the system comprising:

at least one input device adapted to receive a response to the stimulus over time and generate an input signal representative of the response;

a processor in electrical communication with the at least one input device and adapted to receive the input signal and associate the input signal with at least a portion of the stimulus over time thus creating an associative mapping representative of the response of the at least one input device to the portions of the stimulus at a given time; and a display device in electrical communication with the processor adapted to receive the associative mapping and selectively display the response and the portions of the stimulus as represented in the associative mapping to a user.

9. A system according to claim 8 further comprising a recording medium adapted to store the stimulus.

10. A system according to claim 8 further comprising the step of comparing the stimulus to an archive of prior responses to a prior stimuli stored on a storage device.

11. A system according to claim 8 wherein the display device displays portions indexed by the associative mapping to a user.

12. A system according to claim 8 wherein the display device is a graphical user interface to interactively retrieve a portion of the associative mapping associated with user-entered criteria.

13. A system according to claim 8 wherein the one or more input devices is a sensor that measures process variables.

14. A system according to claim 13 wherein the stimulus signal is at least one data type, and the one or more input signals include process variables, such that the associative mapping includes new variables each having at least one process variable associated with at least one data type of the stimulus signal at a given time.

15. A system according to claim 8 wherein the display device is a graphical user interface adapted to allow a user to select criteria for displaying portions of the response and the stimulus, the system further comprising an analyzer adapted to receive the criteria and statistically analyze the stimulus and the response thus allowing the graphical user interface to display the portions of the stimulus and the response matching the criteria.

16. A system according to claim 15 wherein the criteria is the quantitative value of a statistical function of the response.

17. A system according to claim 8 further comprising an analyzer in communication with the processor adapted to parse the associative mapping and receive a user criteria representative of portions of the response to be displayed on the display device and transmit to the display device the portions of the response and stimulus corresponding to the user criteria entered.

18. A quality control system for determining the quality of a product comprising:

at least one monitoring device adapted to record a test image of the product;

a storage device upon which a quality image of the product is stored, the quality image is of an acceptable product; and an analyzer in communication with the monitoring device adapted to receive the test image, and in communication with the storage device adapted to receive the quality image and to compare the test image against the quality image for differences and thus determine if the quality of the product is acceptable.

19. A system according to claim 18 wherein the monitoring device records a sonar image.

20. A system according to claim 18 wherein the monitoring device is an x-ray device.

21. A system according to claim 18 wherein the quality image includes a parameter signature, the system further comprising at least one sensor device in communication with the analyzer adapted to evaluate the product and record a signature of the product such that the analyzer compares the signature against the parameter signature to determine quality.

22. A system according to claim 18 wherein the quality image includes a parameter list and the analyzer compares the test image against the parameter list to determine quality.

23. A system according to claim 22 wherein the parameter list is a list of acceptable temperatures for welds.

24. A system for determining a response to a stimulus, the system comprising:

one or more input devices, each adapted to independently translate a response to the stimulus into an input signal which quantifies the stimulus;

a stimulus signal representative of the stimulus; and a processor in electrical communication with the one or more input devices such that the processor correlates by time the input signal of each of the one or more input devices to the stimulus signal to form an associative mapping representative of the input signal of each of the one or more input devices to the stimulus at a given time, at least one of the one or more input devices being a sensor that measures an environmental condition.

25. A system according to claim 24 wherein the sensor measures a process variable.

26. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time, the one or more input devices comprising at least a first group having first variables, and a second group having second variables, at least one variable being different between the first group and the second group, the first group being disposed at a first angle to the stimulus that differs from a second angle of the second group to the stimulus.

27. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time, the stimulus comprising a time-delayed presentation.

28. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time; and at least one monitoring device adapted to receive the stimulus and generate the stimulus signal, the at least one monitoring device detecting light outside the visible spectrum.

29. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time, the processor comprising a multi-channel associative cache that associates video, audio, and response variables with time.

30. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time, the processor including a stored stimulus signal to compare against the stimulus signal and generating a difference signal representative of the differences between the stimulus signal and the stored signal.

31. A system according to claim 30 wherein the processor alarms if the difference signal exceeds a threshold value.

32. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time;

a monitoring device in electrical communication with the processor adapted to record the stimulus signal; and a display in electrical communication with the processor, the display being adapted to display both the response and the stimulus correlated therewith as represented by the associative mapping.

33. The system according to claim 32 wherein the display displays the response and the stimulus substantially instantaneously after the creation of the associative mapping.

34. The system according to claim 32 further comprising a video recorder being adapted to record an image generated by the display substantially instantaneously after the creation thereof.

35. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time; and a display in electrical communication with the processor, the display being adapted to display the associated mapping substantially instantaneously after the creation thereof.

36. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time; and an analyzer in electrical communication with the processor, the analyzer adapted to perform statistical analysis on the input signals from each of the one or more input devices to find segments of the stimulus signal.

37. The system according to claim 36 wherein the analyzer determines a point of statistical interest as measured against predetermined criteria.

38. The system according to claim 36 wherein the analyzer interpolates information based upon the input signals from each of the one or more input devices.

39. The system according to claim 36 wherein the analyzer extrapolates information based upon the input signals from each of the one or more input devices.

40. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time; and a computer in electrical communication with the processor such that the processor transmits the stimulus signal and the input signals in raw form to the computer.

41. A system for determining a response to a stimulus, the system comprising:

one or more input devices, each adapted to independently translate a response to the stimulus into an input signal which quantifies the stimulus;

a stimulus signal representative of the stimulus;

a processor in electrical communication with the one or more input devices such that the processor correlates by time the input signal of each of the one or more input devices to the stimulus signal to form an associative mapping representative of the input signal of each of the one or more input devices to the stimulus at a given time; and a computer in electrical communication with the processor such that the processor performs digital signal processing on the stimulus signal and the input signals to the computer.

42. The system according to claim 41 wherein the computer comprises a graphical user interface through which a user selects which statistical analysis is performed.

43. The system according to claim 41 wherein the computer comprises a graphical user interface adapted to display the associative mapping in real time.

44. The system according to claim 41 wherein the computer comprises a mass storage device upon which the associative mapping is stored, and a graphical user interface adapted to display the associative mapping which is recalled from the mass storage device.

45. The system according to claim 41 wherein the computer comprises a storage device upon which the associated mapping is stored, the storage device having an organized structure for storing the associative mapping such that the associative mapping can be accessed by content.

46. The system according to claim 41 wherein the computer comprises a storage device upon which the associative mapping is stored, the storage device is adapted to allow a user to retrieve user selected portions defined by the associative mapping upon request by the user such that the associative mapping can be randomly accessed.

47. The system according to claim 46 wherein the associative mapping is addressable by content.

* * * * *

UNITED STATES PATENT AND TRADEMARK OFFICE

CERTIFICATE OF CORRECTION

PATENT NO. : 5,995,941
DATED : November 30, 1999
INVENTOR(S) : John Maguire

It is certified that error appears in the above-identified patent and that said Letters Patent is hereby corrected as shown below:

On the title page of the patent, please correct the Inventors section from:

[76] Inventors: John Maquire, 152 Independence Rd.. Concord. Mass. 01742; Terry Potter, 45 Jackson Dr.. Acton. Mass. 01720 to:

[76] Inventors: John Maguire, 152 Independence Rd., Concord, Mass. 01742; Terry Potter, 45 Jackson Dr., Acton, Mass. 01720

Signed and Sealed this

Fourteenth Day of August, 2001

*Attest:*

NICHOLAS P. GODICI

*Attesting Officer* *Acting Director of the United States Patent and Trademark Office*